United States Patent
Klatt et al.

(10) Patent No.: US 10,531,271 B2
(45) Date of Patent: Jan. 7, 2020

(54) IMPROVING DEVICE TO DEVICE COMMUNICATION

(71) Applicant: Deutsche Telekom AG, Bonn (DE)

(72) Inventors: Axel Klatt, Cologne (DE); Georg Wannemacher, St. Ingbert (DE)

(73) Assignee: DEUTSCHE TELEKOM AG, Bonn (DE)

( * ) Notice: Subject to any disclaimer, the term of this patent is extended or adjusted under 35 U.S.C. 154(b) by 0 days.

(21) Appl. No.: 15/309,220

(22) PCT Filed: May 5, 2015

(86) PCT No.: PCT/EP2015/059886
§ 371 (c)(1),
(2) Date: Nov. 7, 2016

(87) PCT Pub. No.: WO2015/169818
PCT Pub. Date: Nov. 12, 2015

(65) Prior Publication Data
US 2017/0086055 A1  Mar. 23, 2017

(30) Foreign Application Priority Data
May 9, 2014 (EP) ..................... 14167757

(51) Int. Cl.
*H04W 8/00* (2009.01)
*H04W 4/70* (2018.01)
*H04W 72/04* (2009.01)

(52) U.S. Cl.
CPC ............. *H04W 8/005* (2013.01); *H04W 4/70* (2018.02); *H04W 72/0453* (2013.01)

(58) Field of Classification Search
None
See application file for complete search history.

(56) References Cited

U.S. PATENT DOCUMENTS

| 2014/0094212 A1 | 4/2014 | Ahn et al. |
| 2015/0043448 A1* | 2/2015 | Chatterjee ............. H04W 8/005 370/329 |

(Continued)

FOREIGN PATENT DOCUMENTS

| CN | 103118368 A | 5/2013 |
| CN | 103428817 A | 12/2013 |

(Continued)

OTHER PUBLICATIONS

Intel Corporation: "On Resource Allocation and System Operation for D2D Discovery", 3GPP Draft; r1-134141—Intel-Discovery Resource Allocation, $3^{rd}$ Generation Partnership Project (3GPP), Mobile Competence Centre; 650, route des Lucioles, f-06921 Sophia-Antipolis Cedex, France; vol. ran WG1, No. Guangzhou; China; Oct. 7, 2013-Oct. 11, 2013 Sep. 28, 2013 (Sep. 28, 2013), XP050717331.

(Continued)

*Primary Examiner* — Hicham B Foud
(74) *Attorney, Agent, or Firm* — Leydig, Voit & Mayer, Ltd.

(57) ABSTRACT

A method for at least one of device to device proximity detection and device to device communication between a first user equipment and a second user equipment includes transmitting, by a base station entity as part of first control data, a first discovery resource configuration information and a second discovery resource configuration information. The first discovery resource configuration information indicates first air interface resources usable for discovery purposes involving the first user equipment. The second discovery resource configuration information indicates second air interface resources usable for discovery purposes involving the second user equipment. The method further includes subsequently performing, by the first user equipment using the second discovery resource configuration information, a (Continued)

discovery procedure towards the second user equipment by using the second air interface resources.

8 Claims, 2 Drawing Sheets

(56) References Cited

U.S. PATENT DOCUMENTS

| | | | |
|---|---|---|---|
| 2015/0078466 A1 | 3/2015 | Zhou et al. | |
| 2015/0223141 A1* | 8/2015 | Chatterjee | H04W 40/246 370/329 |
| 2015/0223147 A1 | 8/2015 | Fujishiro et al. | |
| 2016/0100401 A1* | 4/2016 | Xiong | H04W 76/10 455/450 |
| 2016/0219541 A1* | 7/2016 | Chatterjee | H04W 76/18 |
| 2018/0020459 A1* | 1/2018 | Chatterjee | H04W 76/18 |

FOREIGN PATENT DOCUMENTS

| | | |
|---|---|---|
| WO | WO 20131172755 A1 | 11/2013 |
| WO | WO 2014034286 A1 | 8/2016 |

OTHER PUBLICATIONS

Samsung: "Inter Cell Discovery", 3GPP Draft; R2-140194, $3^{rd}$ Generation Partnership Project (3GPP), Mobile Competence Centre; 650, Route Des Lucioles; F-06921 Sophia-Antipolis Cedex; France, vol. RAN WG2, No. Prague, Czech Republic; Feb. 10, 2014-Feb. 14, 2014 Feb. 9, 2014 (Feb. 9, 2014), XP050737424.

Samsung: "Resource Partitioning via Bandwidth Reduction for Co-channel Deployments", 3GPP DRAFT; R1-104628 Non-CA Based Control ICIC:Final, $3^{rd}$ Generation Partnership Project (3GPP), Mobile Competence Centre; 650, Route Des Lucioles; F-06921 Sophia-Antipolis Cedex; France, vol. Ran WG1, No. Madrid, Spain; Aug. 23, 2010, Aug. 18, 2010 (Aug. 18, 2010), XP050450108.

* cited by examiner

IMPROVING DEVICE TO DEVICE COMMUNICATION

CROSS-REFERENCE TO RELATED APPLICATIONS

This application is a U.S. National Phase application under 35 U.S.C. § 371 of International Application No. PCT/EP2015/059886, filed on May 5, 2015, and claims benefit to European Patent Application No. EP 14167757.5, filed on May 9, 2014. The International Application was published in English on Nov. 12, 2015 as WO 2015/169818 A1 under PCT Article 21(2).

FIELD

The present invention relates a method for improving device to device communication between a first user equipment and a second user equipment.

Furthermore, the present invention relates to a user equipment adapted for improved device to device communication between the user equipment and a second user equipment.

Additionally, the present invention relates to a system for improving device to device communication between a first user equipment and a second user equipment Additionally, the present invention relates to a mobile communication network for improving device to device communication between a first user equipment and a second user equipment.

Furthermore, the present invention relates to a program and to a computer program product for improving device to device communication between a first user equipment and a second user equipment.

The present invention addresses, inter alia, a method allowing at least two mobile terminal devices (or user equipments) that are capable of establishing a direct communication link between these devices (or user equipments)—hereinafter called device-to-device communication or device to device communication or D2D communication—to discover each other, i.e. initially exchange information directly between these devices.

BACKGROUND

It is expected that the LTE (Long Term Evolution) system will allow for an increased usage of device to device communication. The LTE system and LTE-A (LTE Advanced) system comprises the Evolved Universal Mobile Telecommunications System (UMTS) Terrestrial Radio Access Network (E-UTRAN), and the Evolved Packet Core (EPC). The E-UTRAN typically comprises a plurality of base station entities, typically referred to as eNBs (evolved NodeBs) for macro-cells and HeNBs (Home-eNBs) for femto-cells, as well as the cellular terminals (or user equipments).

Device to device communication is currently being defined as a work item in the context of 3GPP (Third Generation Partnership Project), Release 12. The basic principle of LTE device to device communication (LTE D2D) is the possibility to allow for a direct communication between at least two devices (or user equipments) supporting a device to device communication mode. Within the context of the device to device communication, standardized in 3GPP, two modes are part of the 3GPP definitions: an infrastructure-based device to device communication mode and a direct device to device communication mode.

A further feature of the device to device communication is the so-called "discovery" functionality which allows at least two device-to-device-communication-enabled devices (or user equipments) to identify each other if these devices (or user equipments) are in the vicinity of each other. A still further feature of the device to device communication is the so-called "communication" functionality which allows the at least two device-to-device-communication-enabled devices involved in the discovery to initiate a direct communication between each other.

The discovery feature is of interest to critical communication users as well as commercial cellular mobile operators in order to explore new business opportunities with targeted mobile advertising as well as supporting the growing trend of social networking where the environment of the current location of the user equipment (i.e. the proximity of the current location) plays a more and more important role. Additionally, device to device communications, and especially proximity services, are likewise interesting for automotive applications in order to establish new services, e.g., for car-to-car communication, traffic management and traffic alert.

The successful execution of the discovery procedure between two user equipments typically requires the search for commonly used frequencies in order to enable a direct information exchange between the two user equipments. This might lead to situations where a successful execution of the discovery procedure is only possible with a considerable consumption of energy.

SUMMARY

In an embodiment, the present invention provides a method for device to device proximity detection and/or device to device communication between a first user equipment and a second user equipment, the first user equipment and the second user equipment being enabled to use a device to device mode (D2D mode), wherein using the D2D mode includes a discovery procedure between the first and second user equipments, wherein the first user equipment is related to a mobile communication network comprising a core network and an access network, the access network of the mobile communication network comprising a base station entity, wherein a first frequency or frequency band is used for the reception of first control data by the first user equipment, the first control data being sent by the base station entity, and wherein a second frequency or frequency band is used for the reception of second control data by the second user equipment. The method includes the following steps: in a first step, the base station entity transmits, as part of the first control data, a first discovery resource configuration information and a second discovery resource configuration information, the first discovery resource configuration information indicating first air interface resources usable for discovery purposes involving the first user equipment, and the second discovery resource configuration information indicating second air interface resources usable for discovery purposes involving the second user equipment; and in a second step, subsequent to the first step, the first user equipment uses the second discovery resource configuration information for performing a discovery procedure towards the second user equipment by using the second air interface resources.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
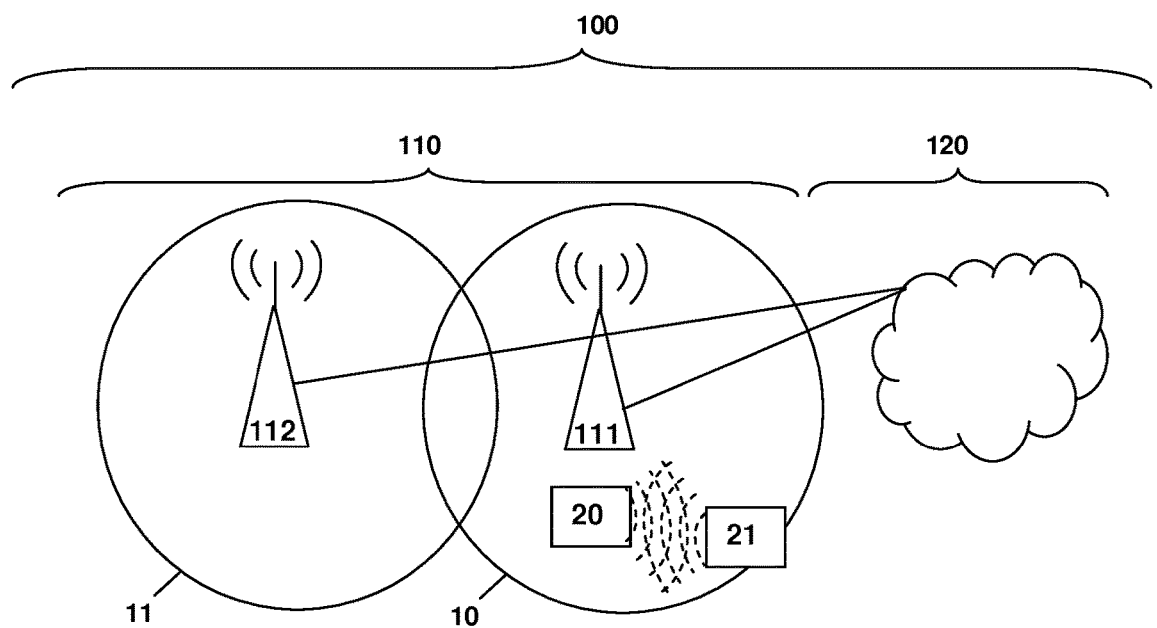
FIGS. 1 and 2 schematically illustrate mobile communication networks being enabled for allowing the possibility to conduct device to device proximity detection and/or device to device communication between user equipments according to the present invention.

Embodiments of the present invention provide a technically simple, effective and especially cost effective solution for enabling device to device proximity detection and/or device to device communication between at least two user equipments such that the energy consumption for the discovery procedure is reduced with respect to the state of the art.

In an embodiment, the present invention provides a method for improving device to device proximity detection and/or device to device communication between a first user equipment and a second user equipment, the first user equipment and the second user equipment being enabled to use a device to device mode (D2D mode), wherein using the device to device mode for device to device proximity detection and/or device to device communication purposes between the first and second user equipments requires performing a discovery procedure between the first and second user equipments, at least the first user equipment being related to a mobile communication network comprising a core network and an access network, the access network of the mobile communication network comprising a base station entity, wherein a first frequency or frequency band is used for the reception of first control data by the first user equipment, the first control data being sent by the base station entity, and wherein a second frequency or frequency band is used for the reception of second control data by the second user equipment, wherein the method comprises the following steps:

in a first step, the base station entity transmits, as part of the first control data, a first discovery resource configuration information and a second discovery resource configuration information, the first discovery resource configuration information indicating first air interface resources being possibly used for discovery purposes involving the first user equipment, the second discovery resource configuration information indicating second air interface resources being possibly used for discovery purposes involving the second user equipment, in a second step, subsequent to the first step, the first user equipment uses the second discovery resource configuration information for performing a discovery procedure towards the second user equipments by using the second air interface resources.

It is thereby advantageously possible according to the present invention that a method for improving device to device proximity detection and/or device to device communication is provided, wherein the consumption of energy for the discovery procedure is reduced with respect to the state of the art. Moreover, the discovery procedure is preferably performed relatively fast because the second air interface resources are indicated to the first user equipment by the mobile communication network, e.g. a Public Land Mobile Network (PLMN). Thereby, embodiments of the invention provide a relatively fast and efficient discovery for device to device proximity detection and/or device to device communication, especially when distinct first and second air interface resources are used by the first and second user equipment. Due to the transmission of the second discovery resource configuration information from the base station entity to the first user equipment, it is advantageously possible to inform the first user equipment not only about the first air interface resources but also about the second air interface resources such that the effort of searching for air interface resources required for the discovery of the second user equipment is reduced. The transmission of the second discovery resource configuration information as part of the first control data allows for further improvement of the device to device proximity detection and/or device to device communication method because further communication overhead due to a separate transmission of the second discovery resource configuration information is avoided.

According to the present invention it is furthermore preferred that device to device proximity detection and/or device to device communication between the first user equipment and a third user equipment is improved, wherein the third user equipment is enabled to use a device to device mode (D2D mode), wherein using the device to device mode for device to device proximity detection and/or device to device communication purposes between the first and third user equipments requires performing a discovery procedure between the first and third user equipments, wherein a third frequency or frequency band is used for the reception of third control data by the third user equipment, wherein the method comprises the following steps:

in a further first step, the base station entity transmits, as part of the first control data, third discovery resource configuration information, the third discovery resource configuration information indicating third air interface resources being possibly used for discovery purposes involving the third user equipment, in a further second step, subsequent to the further first step, the first user equipment uses the third discovery resource configuration information for performing a discovery procedure towards the third user equipments by using the third air interface resources.

It is thereby advantageously possible that device to device proximity detection and/or device to device communication between the first user equipment, on the one hand, and the second and third user equipment, on the other hand, is improved with regard to the consumption of energy and performed relatively fast with respect to the state of the art. Similarly, the method according to the present invention may be used to improve the device to device proximity detection and/or device to device communication between the first user equipment and a plurality of other user equipments in addition to the second and third user equipments. Preferably, the third discovery resource configuration information indicating third air interface resources being possibly used for discovery purposes involving the third user equipment is of the same kind than the second discovery resource configuration.

According to the present invention it is preferred that the method further includes a third and a fourth step, wherein, in the third step, the base station entity or a further base station entity transmits, as part of the second control data, the first and second discovery resource configuration information, wherein in a fourth step, subsequent to the third step, the second user equipment uses the first discovery resource configuration information for performing a discovery procedure towards the first user equipment by using the first air interface resources. Moreover, the third user equipment is preferably camping on a further mobile communication network or any other mobile communication network of a plurality of other mobile communication networks.

It is thereby advantageously possible to provide the first and second resource configuration information to the first and to the second user equipment such that the device to device proximity detection and/or device to device communication is further improved.

According to a preferred embodiment of the present invention, the first control data are transmitted, by the base station entity, on a broadcast control channel (BCCH), the broadcast control channel being received by the first user equipment.

Thereby, it is advantageously possible to distribute the second discovery resource configuration information to a plurality of first user equipments of the mobile communication network in a relatively simple and efficient manner.

According to a further preferred embodiment of the present invention, the second air interface resources are indicated, within the second discovery resource configuration information, via at least the following parameters:
 a frequency indication,
 a relative time offset to the system frame number (SFN), and
 a radio resource block allocation.

Thereby, it is advantageously possible to provide the first user equipment with a comparatively accurate indication of the second air interface resources such that the effort required for the discovery procedure performed by the first user equipment is reduced, in particular with respect to energy consumption.

According to a further preferred embodiment of the present invention, the second discovery resource configuration information is transmitted using
 a system information block, the system information block comprising the first discovery resource configuration information for the device to device mode, or
 a separate system information block only comprising the second discovery resource configuration information.

It is thereby advantageously possible to further reduce communication overhead associated with the transmission of the second discovery resource configuration.

According to a further preferred embodiment of the present invention, the first user equipment and the second user equipment are related to the mobile communication network, but the first frequency or frequency band and the second frequency or frequency band being different frequencies or frequency bands.

Thereby it is advantageously possible according to the present invention that the first and second user equipment are enabled to discover each other via the discovery procedure even in case that the user equipments are operating on different frequencies or frequency bands (inter-frequency discovery). According to the present invention, the first and second user equipments are preferably associated with the same mobile communication network, wherein an efficient inter-frequency discovery is realized across all frequencies used by the mobile communication network (intra-PLMN discovery). Alternatively, the first and second user equipments are preferably associated with different mobile communication networks, wherein an efficient inter-frequency discovery is realized between the different mobile communication networks (inter-PLMN discovery).

According to a further preferred embodiment of the present invention, the second user equipment is related to a further mobile communication network, the further mobile communication network using the second frequency or frequency band, wherein the first frequency or frequency band and the second frequency or frequency band are different frequencies or frequency bands.

Thereby, it is advantageously possible to provide the first user equipment with the second discovery resource configuration information such that inter-PLMN discovery is enabled even in cases where a sharing of network resources between the different PLMNs (network sharing) is disabled. Preferably, a direct information exchange is realized between the first and second user equipment belonging to two different operators (PLMNs) while operating on different frequencies or frequency bands. Such an inter-PLMN discovery support especially enhances commercial success of the D2D discovery functionality, in particular for new localized services such as location dependent advertising or location aware social media.

According to a further preferred embodiment of the present invention, the second air interface resources are either part of the second frequency or frequency band or of another frequency or frequency band and/or wherein the first air interface resources are either part of the first frequency or frequency band or of another frequency or frequency band.

Thereby, it is advantageously possible that the first user equipment may use the second resource discovery configuration information to activate or deactivate a receiver of the first user element depending on the second resource discovery configuration information. For example, the first user equipment may deactivate the receiver during a time interval in which receptions of discovery messages are not expected.

Furthermore, the present invention relates to a user equipment adapted for improved device to device proximity detection and/or device to device communication between the user equipment and a second user equipment, the user equipment and the second user equipment being enabled to use a device to device mode (D2D mode), wherein using the device to device mode for device to device proximity detection and/or device to device communication purposes between the user equipment and second user equipment requires performing a discovery procedure between the user equipment and the second user equipment, at least the user equipment being related to a mobile communication network comprising a core network and an access network, the access network of the mobile communication network comprising a base station entity, wherein a first frequency or frequency band is used for the reception of first control data by the user equipment, the first control data being sent by the base station entity, and wherein a second frequency or frequency band is used for the reception of second control data by the second user equipment, wherein the user equipment is configured such that:
 the user equipment receives, as part of the first control data sent by the base station entity, a first discovery resource configuration information and a second discovery resource configuration information, the first discovery resource configuration information indicating first air interface resources being possibly used for discovery purposes involving the user equipment, the second discovery resource configuration information indicating second air interface resources being possibly used for discovery purposes involving the second user equipment,
 the user equipment uses the second discovery resource configuration information for performing a discovery procedure towards the second user equipments by using the second air interface resources.

Thereby, it is advantageously possible to provide a user equipment capable of using the second discovery resource configuration information such that device to device proximity detection and/or device to device communication is improved with respect to the consumption of energy for the discovery procedure.

Furthermore, the present invention relates to a system for improving device to device proximity detection and/or device to device communication between a first user equipment and a second user equipment, the system comprising a mobile communication network, the first user equipment and the second user equipment, the first user equipment and the second user equipment being enabled to use a device to device mode (D2D mode), wherein using the device to device mode for device to device proximity detection and/or device to device communication purposes between the first and second user equipments requires performing a discovery procedure between the first and second user equipments, at least the first user equipment being related to the mobile communication network comprising a core network and an access network, the access network of the mobile communication network comprising a base station entity, wherein a first frequency or frequency band is used for the reception of first control data by the first user equipment, the first control data being sent by the base station entity, and wherein a second frequency or frequency band is used for the reception of second control data by the second user equipment, wherein the system is configured such that:

the base station entity transmits, as part of the first control data, a first discovery resource configuration information and a second discovery resource configuration information, the first discovery resource configuration information indicating first air interface resources being possibly used for discovery purposes involving the first user equipment, the second discovery resource configuration information indicating second air interface resources being possibly used for discovery purposes involving the second user equipment, the first user equipment uses the second discovery resource configuration information for performing a discovery procedure towards the second user equipments by using the second air interface resources.

Thereby, it is advantageously possible to provide a system being configured to apply the method according to the present invention, wherein the second discovery resource configuration information is provided to the first user equipment such that device to device proximity detection and/or device to device communication is improved with respect to the state of the art. According to a further embodiment of the present invention, the system is preferably at least one of an Earthquake and Tsunami Warning System (ETWS), a Public Warning System, an enhanced Multimedia Broadcast and Multicast System (eMBMS) and a Short Message Service (SMS) Cell Broadcast System.

Furthermore, the present invention relates to a mobile communication network for improving device to device proximity detection and/or device to device communication between a first user equipment and a second user equipment, the first user equipment and the second user equipment being enabled to use a device to device mode (D2D mode), wherein using the device to device mode for device to device proximity detection and/or device to device communication purposes between the first and second user equipments requires performing a discovery procedure between the first and second user equipments, at least the first user equipment being related to the mobile communication network comprising a core network and an access network, the access network of the mobile communication network comprising a base station entity, wherein a first frequency or frequency band is used for the reception of first control data by the first user equipment, the first control data being sent by the base station entity, and wherein a second frequency or frequency band is used for the reception of second control data by the second user equipment, wherein the mobile communication network is configured such that:

the base station entity transmits, as part of the first control data, a first discovery resource configuration information and a second discovery resource configuration information, the first discovery resource configuration information indicating first air interface resources being possibly used for discovery purposes involving the first user equipment, the second discovery resource configuration information indicating second air interface resources being possibly used for discovery purposes involving the second user equipment, the first user equipment uses the second discovery resource configuration information for performing a discovery procedure towards the second user equipments by using the second air interface resources.

Thereby, it is advantageously possible to provide a mobile communication network, in particular a PLMN, wherein the second discovery resource configuration information is provided to the first user equipment such that the first user equipment may use the second discovery resource configuration in order to improve device to device proximity detection and/or device to device communication, in particular with respect to the consumption of energy.

Additionally, the present invention relates to a program comprising a computer readable program code which, when executed on a computer or on a user equipment or a base station entity, or in part on the user equipment and in part on the base station entity, causes the computer or the user equipment or the base station entity to perform embodiments of the invention.

Still additionally, the present invention relates to a computer program product for using a user equipment with a base transceiver station, the computer program product comprising a computer program stored on a storage medium, the computer program comprising program code which, when executed on a computer or on a user equipment or a base station entity, or in part on the user equipment and in part on the base station entity, causes the computer or the user equipment or the base station entity to perform embodiments of the invention.

These and other characteristics, features and advantages of the present invention will become apparent from the following detailed description, taken in conjunction with the accompanying drawings, which illustrate, by way of example, the principles of the invention. The description is given for the sake of example only, without limiting the scope of the invention. The reference figures quoted below refer to the attached drawings.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

Where an indefinite or definite article is used when referring to a singular noun, e.g. "a", "an", "the", this includes a plural of that noun unless something else is specifically stated.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

In FIG. 1, a mobile communication network 100, especially a public land mobile network 100, is schematically shown, the mobile communication network 100 comprising an access network 110 and a core network 120. The mobile communication network 100 is preferably a cellular telecommunications network comprising typically a plurality of network cells, wherein two neighbouring cells are represented in FIG. 1 by means of reference signs 10 and 11. In the mobile communication network 100, a first user equipment 20 is camping on the mobile communication network 100 within the network cell 10, i.e. the first user equipment 20 is connected to or camping on a base station entity 111 serving the cell 10. Furthermore, a neighbour base station entity 112 serving the neighbour cell 11 is schematically shown. The first user equipment 20 uses a first frequency or frequency band 320 for the reception of first control data from the base station entity 111. A second frequency or frequency band 321 is used for the reception of second control data by the second user equipment 21. According to a preferred embodiment, the first user equipment 20 and the second user equipment 21 are both camping on the same mobile communication network 100. For example, the first and second user equipment 20, 21 are camping on the same network cell 10 (illustrated in FIG. 1), i.e. the first and second user equipment 20, 21 are connected to or camping on the same base station entity 111 or the first and second user equipments 20, 21 are camping on neighbouring network cells 10, 11 of the mobile communication network 100, wherein, in this case, the second user equipment 21 receives the second control data from the mobile communication network 100 but using another frequency or frequency band than the frequency or frequency band used between the first user equipment 20 and the mobile communication network 100. According to an alternative embodiment of the present invention, the first user equipment 20 is camping on the mobile communication network 100 and the second user equipment 21 is camping on a further mobile communication network 200 (illustrated in FIG. 2), wherein, in this case, the second user equipment 21 receives the second control data from the further mobile communication network 200 (typically using another frequency or frequency band than the frequency or frequency band used by the mobile communication network 100 and the first user equipment 20).

According to the present invention, the first user equipment 20 and the second user equipment 21 are enabled to use a device to device mode (D2D mode) for device to device proximity detection and/or device to device communication. The device to device communication between the first and second user equipments 20, 21 is preferably either unidirectional or bidirectional. Preferably, a discovery procedure between the first and second user equipments 20, 21 is performed, when the device to device mode is used for device to device proximity detection and/or device to device communication purposes between the first and second user equipments 20, 21.

After reception, by the first user equipment 20 from the base station entity 111, of first and second discovery resource configuration information as part of the first control data, the first user equipment 20 uses the second discovery resource configuration information for performing the discovery procedure towards the second user equipments 21. Thereby, the first discovery resource configuration information are configured to indicate first air interface resources 340 (illustrated in FIG. 3) being possibly used for discovery purposes involving the first user equipment 20 and the second discovery resource configuration information are configured to indicate second air interface resources 341 being possibly used for discovery purposes involving the second user equipment 20. The first user equipment 20 uses the second discovery resource configuration information for performing the discovery procedure towards the second user equipments 21 by using the second air interface resources 341.

The first user equipment 20 is configured to discover the second user equipment 21 by performing the discovery procedure, when the first and second user equipments 21, 22 are operating on different frequencies or frequency bands (inter-frequency discovery). For example, the first and second user equipments 21, 22 are associated with the same mobile communication network 100 such that an inter-frequency discovery is realized across all frequencies used by the (same) mobile communication network 100 (intra-PLMN discovery). Alternatively, the first and second user equipments 20, 21 are associated with different mobile communication networks 100, 200 (see FIG. 2) such that an inter-frequency discovery is realized between the different mobile communication networks 100, 200 (inter-PLMN discovery). In both alternatives, the mobile communication network 100 is associated with a first frequency or frequency band 320 being used by the first user equipment 20 for the reception of first control data.

In the intra-PLMN discovery case, the mobile communication network 100 is associated with a second frequency or frequency band 321 (cf. FIG. 3) being used by the second user equipment 21 for the reception of second control data. This means, that both user equipments 20, 21 (i.e. the first and second user equipment 20, 21) are operating on their own dedicated frequencies or frequency bands. For example, the first user equipment 20 is registered to the mobile communication network 100 on the first frequency or frequency band 320 and the second user equipment 21 is registered to the mobile communication network 100 on the second frequency or frequency band 321. Preferably, the first user equipment 20 is configured to listen to a broadcast control channel (BCCH) of the serving network cell 10 of the mobile communication network 100 on which the first user equipment 20 is camping on. Preferably, the configurations of the air interface resources (first and/or second discovery resource configuration information) to be used for device to device discovery are transmitted on a defined System Information Block (SIB) or an enhanced SIB of the Broadcast Control Channel (BCCH) of the mobile communication network 100.

Figure 2:
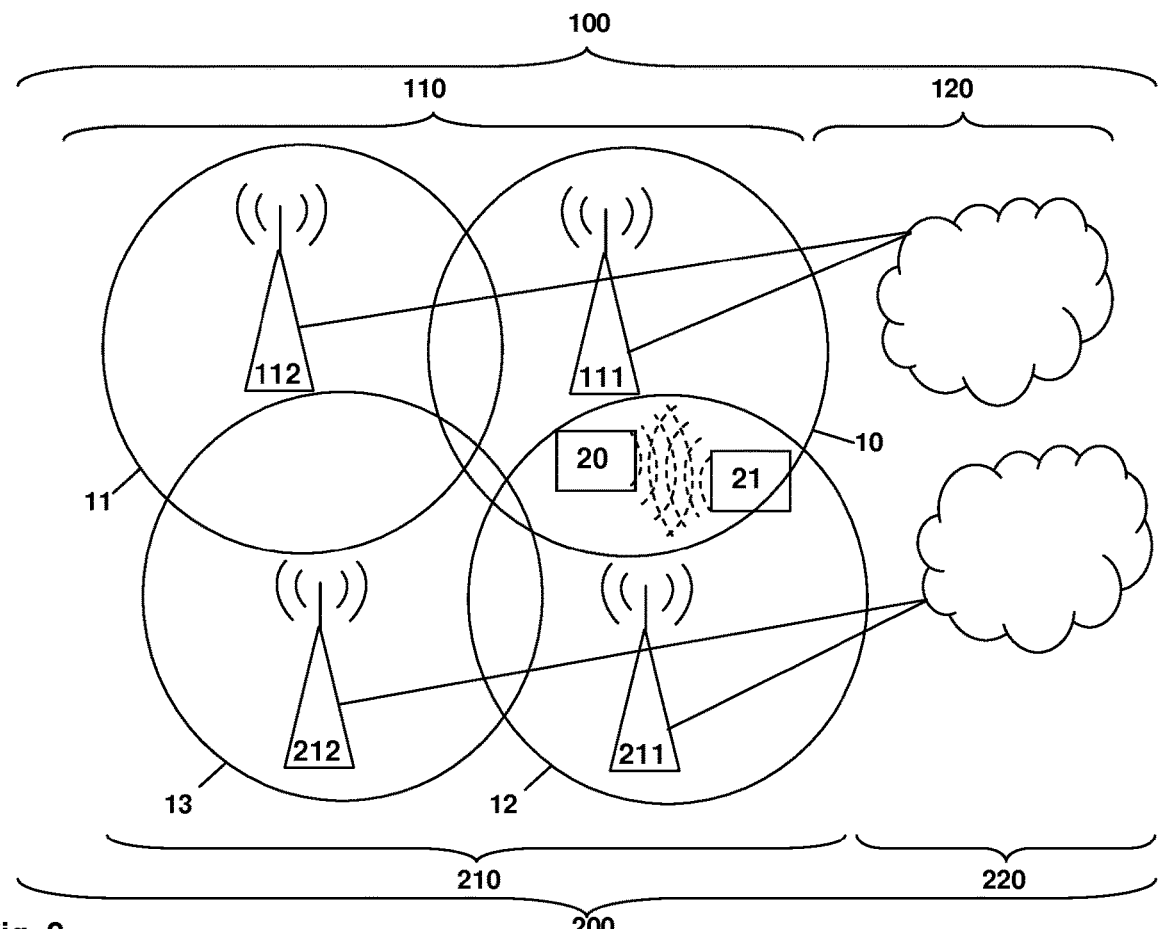

In FIG. 2, a further mobile communication network 200, especially a further public land mobile network 200, is schematically shown in addition to the mobile communication network 100. The further mobile communication network 200 comprises a further access network 210 and a further core network 220. The further mobile communication network 200 is preferably a cellular telecommunications network comprising typically a plurality of network cells, wherein two further neighbouring cells are represented in FIG. 2 by means of reference signs 12 and 13. Here, the inter-PLMN discovery case is shown. In the further mobile communication network 200, the second user equipment 21 is camping on the further mobile communication network 200 within the further network cell 12, i.e. the second user equipment 21 is connected or camping on a further base station entity 211 serving the further cell 12. In addition, a further neighbour base station entity 212 serving the further neighbour cell 13 is illustrated.

According to the inter-PLMN discovery case, the mobile communication network 100 and the further mobile communication network are both operating on their own dedicated frequencies. This means, that the mobile communication network 100 operates on the first frequency or frequency band 320 and the further mobile communication network 200 operates on the second frequency or frequency band 321. Preferably, the mobile communication network 100 and the further mobile communication network 200 at least partially overlap, wherein the mobile communication network 100 and the further mobile communication network are, for example, located in the same country or in country border areas. The first user equipment 20 is registered to the mobile communication network 100 on the first frequency or frequency band 320 and the second user equipment is registered to the further mobile communication network 200 on the second frequency or frequency band 321, wherein preferably the first and second user equipments 20, 21 are each configured to listen to the broadcast control channel of the associated serving network cell 10 or 12, respectively. Preferably, the configurations of the air interface resources (discovery resource configuration information) to be used for device to device discovery are transmitted on a defined System Information Block (SIB) or an enhanced SIB of the Broadcast Control Channel (BCCH) of the mobile communication network 100 and/or a further Broadcast Control Channel of the further mobile communication network 200. Preferably, device to device proximity detection and/or device to device communication is realized even when network sharing or national roaming is disabled. Thereby, it is advantageously possible to enable inter-PLMN discovery support within a country and/or between multiple countries in case of country border areas.

Preferably, the support of inter-PLMN discovery is enabled, which means that the first user equipment 20 receives the information of inter-PLMN discovery resource allocation (second discovery resource configuration information being related to the further mobile communication network 200) from the mobile communication network 100. Preferably, a first and a second discovery resource configuration information is transmitted as part of the first control data, wherein the first control data indicates—e.g. by using an additional single bit—that an inter-PLMN frequency or frequency band (second frequency or frequency band 321) is used for the reception of discovery messages from the second user equipment 21. According to the present invention, the second discovery resource configuration information preferably comprises an identification element for identification of the further mobile communication network 200.

Figure 3:
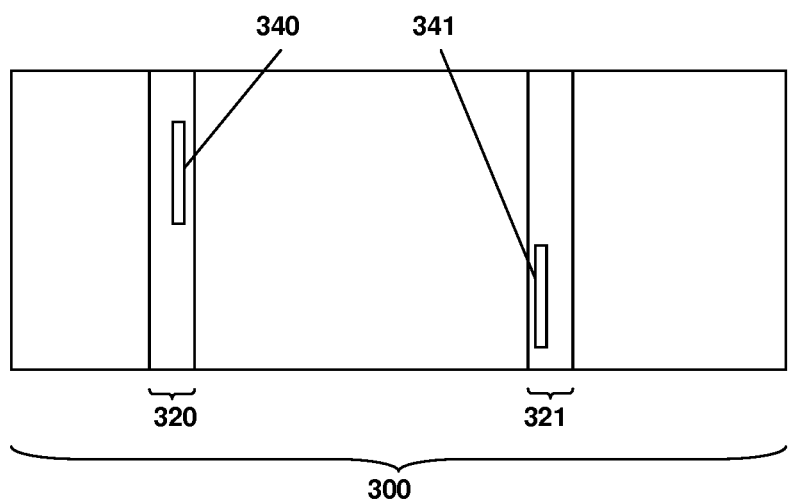
FIG. 3 schematically illustrate frequency bands being used by user equipments according to the present invention.

In FIG. 3 frequency bands 320, 321 being used by user equipments 20, 21 are schematically illustrated, wherein the frequency bands 320, 321 are shown as distinct frequency bands, e.g. licensed frequency bands, of a frequency spectrum 300. Furthermore, first air interface resources 340 and second air interface resources 341 are schematically illustrated. Preferably, the first air interface resource 340 is a contiguous part of the first frequency band 320, wherein preferably the second air interface resource 341 is a contiguous part of the second frequency band 321.

The second air interface resources 341 are preferably indicated via at least three parameters, i.e. a frequency, a relative time offset (resource allocation X) to the system frame number (SFN) and a radio resource block allocation. According to the present invention, a system information block (SIB) is preferably used for the transmission of the second discovery resource configuration information, wherein the SIB includes at least the resource allocation X and a parameter YZ which describes the resource allocation at a point in time to which the relative time offset to the SFN points. It is thereby advantageously possible that the first user equipment 20 (which uses the first frequency or frequency band 320) is provided with information about the resource allocation associated with the first frequency or frequency band 320. Preferably, the first user equipment 20 uses the second discovery resource configuration information for a transmission and/or reception of discovery messages.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for device to device discovery between a first user equipment and a second user equipment, the method comprising:

receiving, by the first user equipment, as part of first control data transmitted from a base station entity of a mobile communication network to the first user equipment using a first frequency or frequency band, first discovery resource configuration information and second discovery resource configuration information from the base station, wherein the first discovery resource configuration information indicates first air interface resources usable for discovery purposes involving the first user equipment, wherein the first air interface resources are part of the first frequency or frequency band or are contiguous to the first frequency or frequency band, and wherein the second discovery resource configuration information indicates second air interface resources, different from the first air interface resources, usable for discovery purposes involving the second user equipment, wherein the second air interface resources are part of a second frequency or frequency band or are contiguous to the second frequency or frequency band, wherein the second frequency or frequency band is different from the first frequency or frequency band and is used for transmission of second control data by the base station entity or another base station entity to the second user equipment; and subsequently performing, by the first user equipment using the second discovery resource configuration information, a discovery procedure towards the second user equipment by using the second air interface resources;

wherein a system information block (SIB) is used for transmission of the second discovery resource configuration information;

wherein the second discovery resource configuration information indicates the second air interface resources with a relative time offset to a system frame number (SFN); and wherein the SIB includes a resource allocation and a parameter which describes the resource allocation at a point in time to which the relative time offset to the SFN relates.

2. The method according to claim 1, wherein the first control data are transmitted by the base station entity to the first user equipment on a broadcast control channel (BCCH).

3. The method according to claim 1, wherein the SIB comprises both the first discovery resource configuration information and the second discovery resource configuration information.

4. The method according to claim 1, wherein both the first user equipment and the second user equipment are connected to the mobile communication network.

5. The method according to claim 1, wherein the second user equipment is connected to a further mobile communication network, wherein the further mobile communication network uses the second frequency or frequency band.

6. The method according to claim 1, wherein the SIB consists of the second discovery resource configuration information.

7. A user equipment adapted for device to device discovery between the user equipment and a second user equipment, wherein the user equipment comprises a processor and a non-transitory computer-readable medium, wherein the user equipment is configured, based on the processor executing processor-executable instructions stored on the non-transitory computer-readable medium, to:

receive first control data transmitted from a base station entity of a mobile communication network using a first frequency or frequency band, wherein the first control data includes first discovery resource configuration information and second discovery resource configuration information, wherein the first discovery resource configuration information indicates first air interface resources usable for discovery purposes involving the user equipment, wherein the first air interface resources are part of the first frequency or frequency band or are contiguous to the first frequency or frequency band, and wherein the second discovery resource configuration information indicates second air interface resources, different from the first air interface resources, usable for discovery purposes involving the second user equipment, wherein the second air interface resources are part of a second frequency or frequency band or are contiguous to the second frequency or frequency band, wherein the second frequency or frequency band is different from the first frequency or frequency band and is used for transmission of second control data by the base station entity or another base station entity to the second user equipment; and use the second discovery resource configuration information for performing a discovery procedure towards the second user equipment by using the second air interface resources;

wherein a system information block (SIB) is used for transmission of the second discovery resource configuration information;

wherein the second discovery resource configuration information indicates the second air interface resources with a relative time offset to a system frame number (SFN); and wherein the SIB includes a resource allocation and a parameter which describes the resource allocation at a point in time to which the relative time offset to the SFN relates.

8. A non-transitory computer-readable medium having processor-executable instructions stored thereon for device to device discovery between a first user equipment and a second user equipment, wherein the processor-executable instructions, when executed, facilitate performance of the following:

receiving, by the first user equipment, first control data transmitted from a base station entity of a mobile communication network using a first frequency or frequency band, wherein the first control data includes first discovery resource configuration information and second discovery resource configuration information, wherein the first discovery resource configuration information indicates first air interface resources usable for discovery purposes involving the first user equipment, wherein the first air interface resources are part of the first frequency or frequency band or are contiguous to the first frequency or frequency band, and wherein the second discovery resource configuration information indicates second air interface resources, different from the first air interface resources, usable for discovery purposes involving the second user equipment, wherein the second air interface resources are part of a second frequency or frequency band or are contiguous to the second frequency or frequency band, wherein the second frequency or frequency band is different from the first frequency or frequency band and is used for transmission of second control data by the base station entity or another base station entity to the second user equipment; and performing, by the first user equipment using the second discovery resource configuration information, a discovery procedure towards the second user equipment by using the second air interface resources;

wherein a system information block (SIB) is used for transmission of the second discovery resource configuration information;

wherein the second discovery resource configuration information indicates the second air interface resources with a relative time offset to a system frame number (SFN); and wherein the SIB includes a resource allocation and a parameter which describes the resource allocation at a point in time to which the relative time offset to the SFN relates.

* * * * *